(No Model.)

S. ORTH.
SPECTACLES.

No. 503,803. Patented Aug. 22, 1893.

Witnesses:
F. D. Goodwin
R. Schleicher

Inventor:
Susette Orth
by her Attorneys
Howson & Howson

UNITED STATES PATENT OFFICE.

SUSETTE ORTH, OF PHILADELPHIA, PENNSYLVANIA.

SPECTACLES.

SPECIFICATION forming part of Letters Patent No. 503,803, dated August 22, 1893.

Application filed May 5, 1893. Serial No. 473,063. (No model.)

*To all whom it may concern:*

Be it known that I, SUSETTE ORTH, a citizen of the United States, residing in Philadelphia, Pennsylvania, have invented certain Improvements in Spectacles, of which the following is a specification.

The object of my invention is to relieve the bridge of the nose of the weight of the spectacles. This object I attain by supporting the spectacles at each side of the face in such a manner that while the spectacles will be raised off the bridge of the nose they will not bear heavily against the side of the face or in appearance be very different from the spectacles now in common use.

Figure 1:
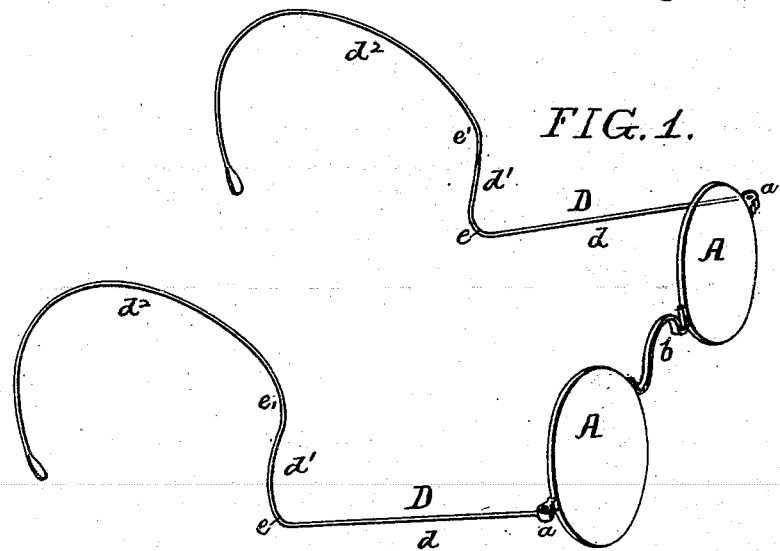
Figure 2:
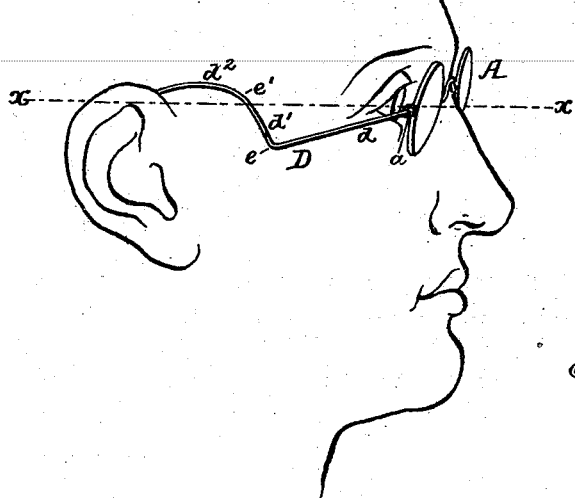
Figure 4:
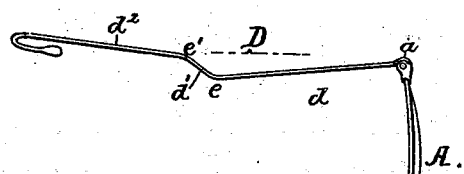
Figure 3:
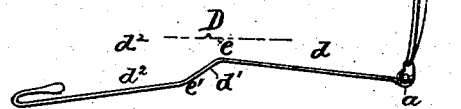

In the accompanying drawings:—Figure 1, is a perspective view of my improved spectacles. Fig. 2, is a view showing the spectacles applied to the face. Fig. 3, is a side view; and Fig. 4, is a plan view.

A A are the lenses.

*b* is the bridge piece which connects the frames of the lenses and which ordinarily rests upon the bridge of the nose.

D are the temples hinged to the lens frame in the ordinary manner. The temples are looped and extend back over the ears.

My invention relates particularly to the temples. Ordinarily the temples are arranged on a straight line $x$ from the center of the eye to the top of the ear, Fig. 2, but temples made in accordance with my invention extend below the line and bear upon the side of the face between the ear and the eye, the bearing being a flat bearing and sufficient to support the lenses and their frames clear of the bridge of the nose.

The temple is made up of three sections $d$, $d'$ and $d^2$. The section $d$ extends on an incline below the line $x$ from the joint $a$ to the point $e$. The section $d'$ extends up from the point $e$ at an angle to the section $d$ to a point $e'$; and the section $d^2$ extends from this point rearward and is curved so that it will rest back of the ear. The temples are so bent, as shown in Fig. 4, that the points $e$, $e$ are nearer together than the points $e'$, and consequently when the spectacles are adjusted to the face and the sections $d^2$ are placed back of the ears, the points $e$ act as pivots, causing the lenses and their frames to rise off the bridge of the nose. The pressure, however, against the side of the face is very light and when the spectacles are adjusted to position the section $d'$ will have a bearing its full length against the face.

In some instances I may place a small cushion between each temple and the face, but this is not essential.

I am aware that it is not new to hold spectacles or eye glasses in position on the face by temple clamps and this I do not claim, but What I do claim is—

1. The combination in spectacles, of the frame with temples connected thereto, each temple having between the frame and the curved rear end a bent portion extending below a line drawn from the center of the eye to the top of the ear, to rest upon the face between the ear and the eye, substantially as described.

2. The combination in spectacles, of the frame, the temple secured thereto, having an inclined portion $d$, a portion $d'$ at an angle to the portion $d$, and a curved portion forming a continuation of the portion $d'$, substantially as described.

3. The combination of the spectacle frame, the temples, each temple having a portion $d$ and a portion $d'$ at an angle to the portion $d$, the lower points of the portion $d'$ when the temples are extended being nearer together than the upper portion so that when the spectacles are adjusted to the face the lower points of the portions $d'$ act as pivots to elevate the bridge piece of the frame off the bridge of the nose, substantially as described.

4. The combination of the spectacles, the frame, the temples connected to the frame having inclined portions $d$, upright portions $d'$ bent as described, with looped portions adapted to pass back of the ear, substantially as set forth.

In testimony whereof I have signed my name to this specification in the presence of two subscribing witnesses.

SUSETTE ORTH.

Witnesses:
 HENRY HOWSON,
 JOSEPH H. KLEIN.